United States Patent [19]
Fujita et al.

[11] Patent Number: 6,066,729
[45] Date of Patent: May 23, 2000

[54] PHOTOTHERMAL CONVERSION MATERIAL

[75] Inventors: Shigeo Fujita; Jun-ichi Taniguchi; Hiroshi Terao; Yojiro Kumagae, all of Osaka, Japan

[73] Assignee: Yamamoto Chemicals, Inc, Osaka, Japan

[21] Appl. No.: 09/193,240

[22] Filed: Nov. 17, 1998

[30] Foreign Application Priority Data

Nov. 18, 1997 [JP] Japan ................................. 9-335046

[51] Int. Cl.⁷ .............................. C09B 47/04; F21V 9/04
[52] U.S. Cl. ..................... 540/125; 540/122; 540/139; 540/140; 252/587
[58] Field of Search ....................... 540/122, 125, 540/139, 140; 252/587

[56] References Cited

U.S. PATENT DOCUMENTS

| | | | |
|---|---|---|---|
| 4,824,947 | 4/1989 | Stark | 540/125 |
| 5,705,101 | 1/1998 | Oi et al. | 252/587 |
| 5,783,694 | 7/1998 | Hagen et al. | 540/123 |

FOREIGN PATENT DOCUMENTS 6287462  10/1994  Japan .

*Primary Examiner*—Mukund J. Shah
*Assistant Examiner*—Pavanaram K Sripada
*Attorney, Agent, or Firm*—Birch, Stewart, Kolasch & Birch, LLP

[57] ABSTRACT

A photothermal conversion material showing high sensitivity to the light of a semiconductor laser having an emission frequency band of 750 nm~900 nm with a high photothermal conversion efficiency and a planographic original plate fabricated by using the transducer are provided. This photothermal conversion material comprises a phthalocyanine compound of the following general formula (I)

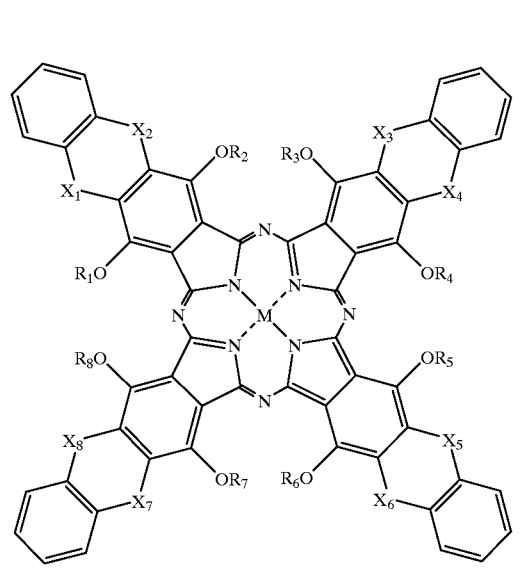

wherein $R_1$~$R_8$ each represents alkyl or alkoxyalkyl; $X_1$~$X_8$ each represents sulfur or $NR_9$, where $R_9$ is hydrogen or alkyl.

10 Claims, No Drawings

PHOTOTHERMAL CONVERSION MATERIAL

FIELD OF THE INVENTION

The present invention relates to a photothermal conversion material which absorbs laser light to generate heat.

BACKGROUND OF THE INVENTION

Keeping abreast with the recent advances in laser technology, studies have been undertaken on methods for converting laser radiation to the thermal energy necessary for recording, for example an image forming method utilizing a laser thermal recording material or a laser thermal transfer printing material for high-speed, high-density, high-image-quality recording or reproduction. Moreover, against the background of the wide-spread use of computers and rapidly developing electronics inclusive of improvements in digital image processing technology, development of the so-called computer-to-plate (CTP) technology for direct fabrication of printing plates from digital data is in progress.

In the technology comprising converting laser light to heat for image recording (laser thermal recording technology), a photothermal conversion material (light-to-heat converter) suited to the wavelength of a laser is used for conversion of absorbed laser light to heat to form an image but unless the laser output is raised to a fairly high level, the thermal energy required for image formation cannot be obtained. Therefore, there is a standing demand for development of a material having a high photothermal conversion efficiency.

The known CTP technology includes, as classified by plate fabrication methodology, the laser light exposure method, the writing method using a thermal head, the method for local voltage application using pin electrodes, and the ink jet method for forming an ink-repellent or ink-receptive layer, among others. The laser light exposure method, in particular, is superior to other methods in resolution and platemaking speed. In this field, therefore, a variety of image-forming techniques are being studied.

Today, compact, high-output, inexpensive semiconductor lasers having an emission band in the near-infrared region (750 nm~900 nm) of the spectrum are readily available and can be exploited as exposure light sources in printing plate fabrication.

The plate fabricating method using laser light is either of the light-sensitive type or of the heat-sensitive type. The light-sensitive plate material is available either in the electrophotographic system using an organic photoconductor (OPC) or in the silver salt system utilizing a salt of silver but both materials have the disadvantage that a large-sized, expensive production equipment is required and that the cost of the plate is fairly high as compared with the conventional presensitized (PS) plate. Furthermore, there is the problem associated with disposal of the developer. Therefore, the above-mentioned plate materials have not been commercially implemented as yet.

The heat-sensitive plate material has the disadvantage of low sensitivity as compared with the light-sensitive plate material but has been extensively studied in view of the advantage that it can be handled under the interior (illuminated) conditions and the required equipment may be small and inexpensive.

The heat-sensitive plate materials invariably require the use of the so-called photothermal transducer for the conversion of light to heat.

It is essential that the photothermal conversion material absorb the laser light used, and for an enhanced sensitivity, its ability to absorb the laser light must be sufficiently high.

The light-to-heat converting substance for such a photothermal conversion material includes pigment type substances and dyestuff type substances. A typical pigment type substance is carbon black. As dyestuff type substances, a variety of substances have been proposed, although polymethine dyes are commonly employed. Carbon black offers a broad choice of compatible lasers but has the disadvantage that its ability to absorb laser light is generally so low compared with dyes that it must be used in large amounts. Moreover, a sophisticated dispersion technique is essential.

The dyestuff type substance must have a large capacity to absorb the emission of the semiconductor laser used, high compatibility with the concomitant image-forming component and resin binder, and high solubility in the solvent used.

Polymethine dyes are essentially of the salt type so that the type of solvent that can be used is limited and the compatibility with the image forming component and resin binder is poor.

OBJECTS AND SUMMARY OF THE INVENTION

The object of the present invention is provide a photothermal conversion material which has high sensitivity to semiconductor lasers having an emission band in the near-infrared region (750 nm~900 nm) of the spectrum and can be used for high-speed, high-density, high-image-quality laser thermal recording. It is a further object of the invention to provide a planographic original plate for CTP use which is capable of giving prints with high image quality.

As the result of their extensive research for accomplishing the above objects, the inventors of the present invention discovered that a phthalocyanine compound having a herein-defined chemical structure can be used as a light-to-heat converting agent and gives a photothermal conversion material which has good sensitivity to laser light, high photothermal conversion efficiency, and good processability for various applications. The inventors have accordingly developed the present invention.

The present invention relates, in a first aspect thereof, to a photothermal conversion material comprising a phthalocyanine compound of the following general formula (I).

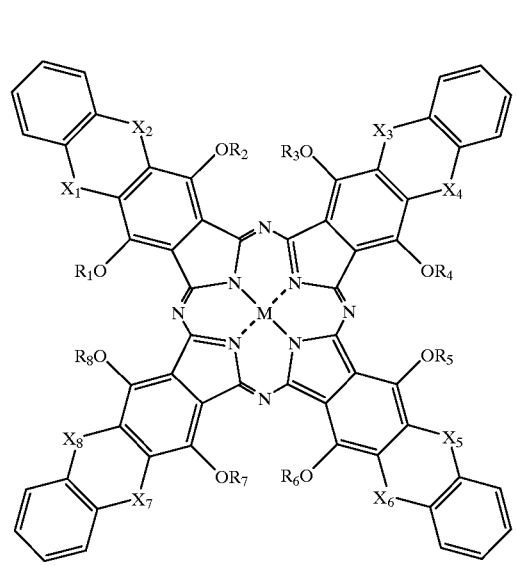

(I)

wherein $R_1$~$R_8$ each represents alkyl or alkoxyalkyl; $X_1$~$X_8$ each represents sulfur or $NR_9$; $X_1$=(either $X_3$ or $X_4$)=(either $X_5$ or $X_6$)=(either $X_7$ or $X_8$)=sulfur and $X_2$=(the other one of $X_3$ and $X_4$)=(the other one of $X_5$ and $X_6$)=(the other one of $X_7$ and $X_8$)=$NR_9$; $R_9$ represents hydrogen or alkyl; M represents a couple of hydrogen atoms, a divalent metal, a trivalent metal derivative, or a tetravalent metal derivative.

The present invention relates, in a second aspect thereof, to a planographic original plate for CTP use which comprises a support and, disposed thereon, a photothermal conversion layer containing the photothermal conversion material according to said first aspect of the invention.

The present invention relates, in a third aspect thereof, to a method of fabricating a planographic printing plate which comprises exposing a planographic original plate according to said second aspect of the invention to light using a semiconductor laser having an emission band of 750 nm~900 nm as a light source.

DETAILED DESCRIPTION OF THE PREFERRED EMBODIMENTS

The present invention is now described in detail.

The first aspect of the present invention is a photothermal conversion material containing a phthalocyanine compound of the following general formula (I).

(I)

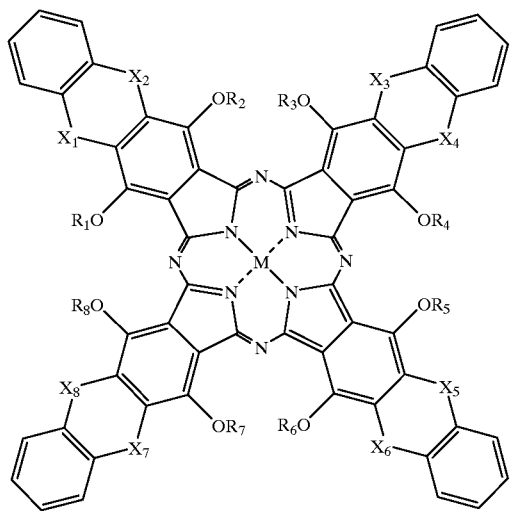

wherein $R_1$~$R_8$ each represents alkyl or alkoxyalkyl; $X_1$~$X_8$ each represents sulfur or $NR_9$; $X_1$=(either $X_3$ or $X_4$)=(either $X_5$ or $X_6$)=(either $X_7$ or $X_8$)=sulfur and $X_2$=(the other one of $X_3$ and $X_4$)=(the other one of $X_5$ and $X_6$)=(the other one of $X_7$ and $X_8$)=$NR_9$; $R_9$ represents hydrogen or alkyl; M represents a couple of hydrogen atoms, a divalent metal, a trivalent metal derivative, or a tetravalent metal derivative.

Thus, the photothermal conversion material according to this invention contains at least one member selected from among the phthalocyanine compounds of the following general formulas (Ia)~(Id).

(Ia)

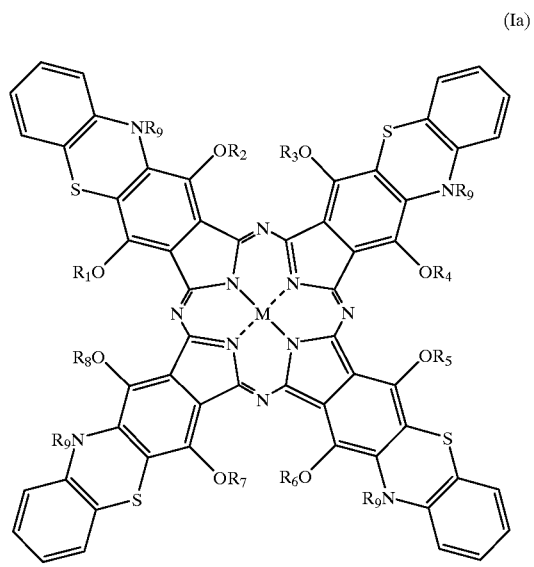

(Ib)

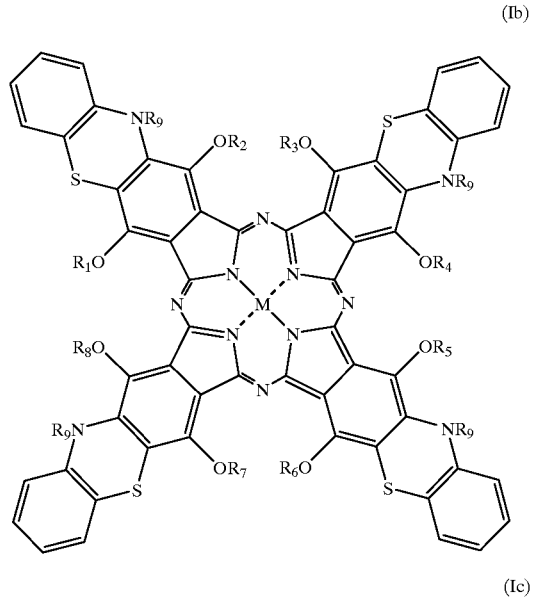

(Ic)

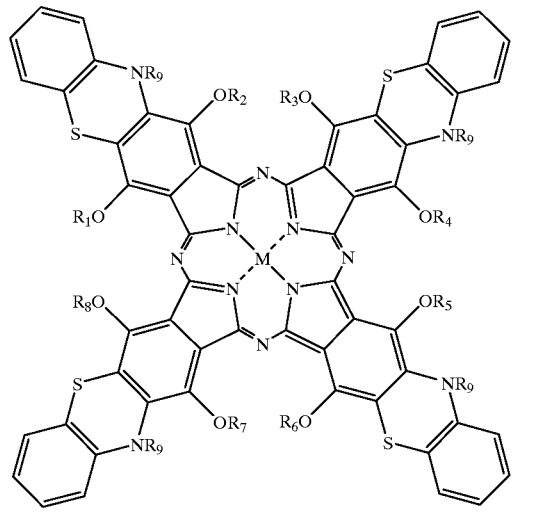

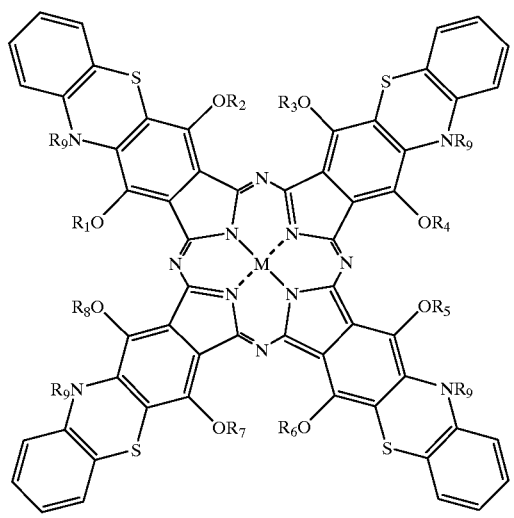

(Id)

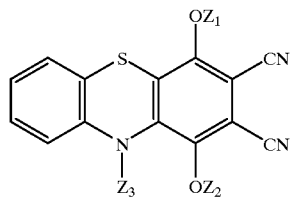

(II)

wherein $Z_1$ and $Z_2$ each represents the same alkyl or alkoxyalkyl group as defined for $R_1$~$R_8$; $Z_3$ represents hydrogen or the same alkyl group as defined for $R_9$.

Table 1 is a list of preferred examples of the compound of general formula (I) which can be used in the present invention.

The compounds shown in Table 1 are those compounds of formula (I) wherein $R_1$=(either $R_3$ or $R_4$)=(either $R_5$ or $R_6$)=(either $R_7$ or $R_8$)and $R_2$=(the other one of $R_3$ and $R_4$)=(the other one of $R_5$ and $R_6$)=(the other one of $R_7$ and $R_8$).

In the above respective formulas, $R_1$~$R_8$ each represents alkyl or alkoxyalkyl; $R^9$ represents hydrogen or alkyl; M represents a couple of hydrogen atoms, a divalent metal, a trivalent metal derivative, or a tetravalent metal derivative.

When any of $R_1$~$R_8$ represents alkyl, it is preferably a straight-chain or branched alkyl group of 1~12 carbon atoms and more preferably a straight-chain or branched alkyl group of 1~8 carbon atoms. To mention specific examples, it may be methyl, ethyl, n-propyl, isopropyl, n-butyl, isobutyl, sec-butyl, n-pentyl, isopentyl, neopentyl, n-hexyl, isohexyl, sec-hexyl, 2-ethylbutyl, n-heptyl, isoheptyl, sec-heptyl, n-octyl, 2-ethylhexyl, n-decyl, and n-dodecyl, among others.

When any of $R_1$~$R_8$ represents alkoxyalkyl, it is preferably a group containing a total of 2 to 6 carbon atoms, thus including methoxyethyl, methoxypropyl, methoxybutyl, ethoxyethyl, ethoxypropyl, ethoxybutyl, n-propoxyethyl, iso-propoxyethyl, and n-propoxypropyl, among others.

When $R_9$ is alkyl, it is preferably a straight-chain or branched alkyl group of 1~12 carbon atoms and more preferably a straight-chain or branched alkyl group of 1~8 carbon atoms. As specific examples, methyl, ethyl, n-propyl, isopropyl, n-butyl, isobutyl, sec-butyl, n-pentyl, isopentyl, neopentyl, n-heptyl, isoheptyl, sec-heptyl, n-octyl, 2-ethylhexyl, n-decyl, and n-dodecyl can be mentioned. Thus, $R_9$ is preferably hydrogen or a straight-chain or branched alkyl group of 1~12 carbon atoms and more preferably hydrogen or a straight-chain or branched alkyl group of 1~8 carbon atoms.

When M represents a divalent metal, it is preferably Cu, Zn, Fe, Co, Ni, Ru, Pb, Rh, Pd, Pt, Mn, or Sn. The trivalent or tetravalent metal derivative is preferably AlCl, InCl, FeCl, MnOH, SiCl$_2$, SnCl$_2$, GeCl$_2$, Si(OH)$_2$, Sn(OH)$_2$, Ge(OH)$_2$, VO, or TiO. In particular, M is preferably Co, Ni, Cu, Zn, VO, or TiO.

The phthalocyanine compound of general formula (I) for use in the present invention can be produced, for example by reacting a phthalonitrile compound of the following general formula (II) with either a metal or a metal derivative in a suitable solvent, preferably in an organic solvent having a boiling point not below 130° C., at a temperature of 100~300° C.

TABLE 1

| Compound Nos. | M | $R_1$ | $R_2$ | $R_9$ |
|---|---|---|---|---|
| (1) | Cu | CH$_3$ | CH$_3$ | H |
| (2) | Cu | CH$_3$ | CH$_3$ | n-C$_6$H$_{13}$ |
| (3) | Cu | C$_2$H$_5$ | C$_2$H$_5$ | n-C$_5$H$_{11}$ |
| (4) | Cu | n-C$_3$H$_7$ | n-C$_3$H$_7$ | n-C$_6$H$_{13}$ |
| (5) | Cu | iso-C$_3$H$_7$ | iso-C$_3$H$_7$ | n-C$_5$H$_{11}$ |
| (6) | Zn | n-C$_4$H$_9$ | n-C$_4$H$_9$ | H |
| (7) | FeCl | n-C$_4$H$_9$ | n-C$_4$H$_9$ | CH$_3$ |
| (8) | Co | n-C$_4$H$_9$ | n-C$_4$H$_9$ | C$_2$H$_5$ |
| (9) | Ni | n-C$_4$H$_9$ | n-C$_4$H$_9$ | n-C$_4$H$_9$ |
| (10) | Pd | n-C$_4$H$_9$ | n-C$_4$H$_9$ | n-C$_6$H$_{13}$ |
| (11) | MnOH | iso-C$_4$H$_9$ | iso-C$_4$H$_9$ | H |
| (12) | VO | iso-C$_4$H$_9$ | iso-C$_4$H$_9$ | n-C$_3$H$_7$ |
| (13) | Ru | iso-C$_4$H$_9$ | iso-C$_4$H$_9$ | C$_2$H$_5$ |
| (14) | Rh | iso-C$_4$H$_9$ | iso-C$_4$H$_9$ | n-C$_4$H$_9$ |
| (15) | Pt | iso-C$_4$H$_9$ | iso-C$_4$H$_9$ | n-C$_5$H$_{11}$ |
| (16) | AlCl | sec-C$_4$H$_9$ | sec-C$_4$H$_9$ | H |
| (17) | InCl | sec-C$_4$H$_9$ | sec-C$_4$H$_9$ | CH$_3$ |
| (18) | Zn | sec-C$_4$H$_9$ | sec-C$_4$H$_9$ | C$_2$H$_5$ |
| (19) | Ni | sec-C$_4$H$_9$ | sec-C$_4$H$_9$ | n-C$_4$H$_9$ |
| (20) | FeCl | sec-C$_4$H$_9$ | sec-C$_4$H$_9$ | n-C$_6$H$_{13}$ |
| (21) | SiCl$_2$ | n-C$_5$H$_{11}$ | n-C$_5$H$_{11}$ | H |
| (22) | Cu | n-C$_5$H$_{11}$ | n-C$_5$H$_{11}$ | n-C$_3$H$_7$ |
| (23) | TiO | n-C$_5$H$_{11}$ | n-C$_5$H$_{11}$ | C$_2$H$_5$ |
| (24) | VO | n-C$_5$H$_{11}$ | n-C$_5$H$_{11}$ | n-C$_5$H$_{11}$ |
| (25) | Pd | n-C$_5$H$_{11}$ | n-C$_5$H$_{11}$ | n-C$_6$H$_{13}$ |
| (26) | Pb | iso-C$_5$H$_{11}$ | iso-C$_5$H$_{11}$ | H |
| (27) | Cu | iso-C$_5$H$_{11}$ | iso-C$_5$H$_{11}$ | H |
| (28) | Zn | iso-C$_5$H$_{11}$ | iso-C$_5$H$_{11}$ | H |
| (29) | FeCl | iso-C$_5$H$_{11}$ | iso-C$_5$H$_{11}$ | H |
| (30) | Co | iso-C$_5$H$_{11}$ | iso-C$_5$H$_{11}$ | H |
| (31) | Ni | iso-C$_5$H$_{11}$ | iso-C$_5$H$_{11}$ | H |
| (32) | Pd | iso-C$_5$H$_{11}$ | iso-C$_5$H$_{11}$ | H |
| (33) | MnOH | iso-C$_5$H$_{11}$ | iso-C$_5$H$_{11}$ | H |
| (34) | VO | iso-C$_5$H$_{11}$ | iso-C$_5$H$_{11}$ | H |
| (35) | Cu | iso-C$_5$H$_{11}$ | iso-C$_5$H$_{11}$ | CH$_3$ |
| (36) | Cu | iso-C$_5$H$_{11}$ | iso-C$_5$H$_{11}$ | C$_2$H$_5$ |
| (37) | Zn | iso-C$_5$H$_{11}$ | iso-C$_5$H$_{11}$ | C$_2$H$_5$ |
| (38) | Pb | iso-C$_5$H$_{11}$ | iso-C$_5$H$_{11}$ | C$_2$H$_5$ |
| (39) | Co | iso-C$_5$H$_{11}$ | iso-C$_5$H$_{11}$ | C$_2$H$_5$ |
| (40) | Ni | iso-C$_5$H$_{11}$ | iso-C$_5$H$_{11}$ | C$_2$H$_5$ |
| (41) | Pd | iso-C$_5$H$_{11}$ | iso-C$_5$H$_{11}$ | C$_2$H$_5$ |
| (42) | MnOH | iso-C$_5$H$_{11}$ | iso-C$_5$H$_{11}$ | C$_2$H$_5$ |
| (43) | VO | iso-C$_5$H$_{11}$ | iso-C$_5$H$_{11}$ | C$_2$H$_5$ |
| (44) | Co | iso-C$_5$H$_{11}$ | iso-C$_5$H$_{11}$ | n-C$_4$H$_6$ |
| (45) | Ru | iso-C$_5$H$_{11}$ | iso-C$_5$H$_{11}$ | n-C$_6$H$_{13}$ |
| (46) | SnCl$_2$ | n-C$_6$H$_{13}$ | n-C$_6$H$_{13}$ | H |
| (47) | Zn | n-C$_6$H$_{13}$ | n-C$_6$H$_{13}$ | CH$_3$ |

TABLE 1-continued

| Compound Nos. | M | $R_1$ | $R_2$ | $R_9$ |
|---|---|---|---|---|
| (48) | Pt | n-$C_6H_{13}$ | n-$C_6H_{13}$ | n-$C_3H_7$ |
| (49) | Ni | n-$C_6H_{13}$ | n-$C_6H_{13}$ | n-$C_5H_{11}$ |
| (50) | Pd | n-$C_6H_{13}$ | n-$C_6H_{13}$ | n-$C_6H_{13}$ |
| (51) | $GeCl_2$ | iso-$C_6H_{13}$ | iso-$C_6H_{13}$ | H |
| (52) | FeCl | iso-$C_6H_{13}$ | iso-$C_6H_{13}$ | $CH_3$ |
| (53) | Cu | iso-$C_6H_{13}$ | iso-$C_6H_{13}$ | $C_2H_5$ |
| (54) | VO | iso-$C_6H_{13}$ | iso-$C_6H_{13}$ | n-$C_4H_9$ |
| (55) | Zn | iso-$C_6H_{13}$ | iso-$C_6H_{13}$ | n-$C_6H_{13}$ |
| (56) | $Si(OH)_2$ | n-$C_7H_{15}$ | n-$C_7H_{15}$ | H |
| (57) | Rh | n-$C_7H_{15}$ | n-$C_7H_{15}$ | $CH_3$ |
| (58) | Zn | n-$C_7H_{15}$ | n-$C_7H_{15}$ | n-$C_3H_7$ |
| (59) | Ni | n-$C_7H_{15}$ | n-$C_7H_{15}$ | n-$C_4H_9$ |
| (60) | Co | n-$C_7H_{15}$ | n-$C_7H_{15}$ | n-$C_5H_{11}$ |
| (61) | $Sn(OH)_2$ | iso-$C_7H_{15}$ | iso-$C_7H_{15}$ | |
| (62) | MnOH | iso-$C_7H_{15}$ | iso-$C_7H_{15}$ | $CH_3$ |
| (63) | TiO | iso-$C_7H_{15}$ | iso-$C_7H_{15}$ | $C_2H_5$ |
| (64) | Pb | iso-$C_7H_{15}$ | iso-$C_7H_{15}$ | n-$C_5H_{11}$ |
| (65) | Mg | iso-$C_7H_{15}$ | iso-$C_7H_{15}$ | n-$C_6H_{13}$ |
| (66) | Cu | n-$C_8H_{17}$ | n-$C_8H_{17}$ | H |
| (67) | $Ge(OH)_2$ | n-$C_8H_{17}$ | n-$C_8H_{17}$ | $CH_3$ |
| (68) | InCl | n-$C_8H_{17}$ | n-$C_8H_{17}$ | $C_2H_5$ |
| (69) | Zn | n-$C_8H_{17}$ | n-$C_8H_{17}$ | n-$C_3H_7$ |
| (70) | FeCl | n-$C_8H_{17}$ | n-$C_8H_{17}$ | n-$C_6H_{13}$ |
| (71) | Cu | $CH_3OC_2H_4$ | $CH_3OC_2H_4$ | H |
| (72) | Zn | $CH_3OC_2H_4$ | $CH_3OC_2H_4$ | H |
| (73) | FeCl | $CH_3OC_2H_4$ | $CH_3OC_2H_4$ | H |
| (74) | Co | $CH_3OC_2H_4$ | $CH_3OC_2H_4$ | H |
| (75) | Ni | $CH_3OC_2H_4$ | $CH_3OC_2H_4$ | H |
| (76) | Pd | $CH_3OC_2H_4$ | $CH_3OC_2H_4$ | H |
| (77) | MnOH | $CH_3OC_2H_4$ | $CH_3OC_2H_4$ | H |
| (78) | VO | $CH_3OC_2H_4$ | $CH_3OC_2H_4$ | H |
| (79) | TiO | $CH_3OC_2H_4$ | $CH_3OC_2H_4$ | $CH_3$ |
| (80) | AlCl | $CH_3OC_2H_4$ | $CH_3OC_2H_4$ | $C_2H_5$ |
| (81) | InCl | $CH_3OC_2H_4$ | $CH_3OC_2H_4$ | n-$C_3H_7$ |
| (82) | MnOH | $CH_3OC_2H_4$ | $CH_3OC_2H_4$ | n-$C_5H_{11}$ |
| (83) | VO | $CH_3OC_3H_6$ | $CH_3OC_3H_6$ | H |
| (84) | Pd | $CH_3OC_3H_6$ | $CH_3OC_3H_6$ | $CH_3$ |
| (85) | Zn | $CH_3OC_3H_6$ | $CH_3OC_3H_6$ | $C_2H_5$ |
| (86) | FeCl | $CH_3OC_3H_6$ | $CH_3OC_3H_6$ | n-$C_4H_9$ |
| (87) | Co | $CH_3OC_3H_6$ | $CH_3OC_3H_6$ | n-$C_6H_{13}$ |
| (88) | Ni | $CH_3OC_4H_8$ | $CH_3OC_4H_8$ | H |
| (89) | Cu | $CH_3OC_4H_8$ | $CH_3OC_4H_8$ | $CH_3$ |
| (90) | Pb | $CH_3OC_4H_8$ | $CH_3OC_4H_8$ | $C_2H_5$ |
| (91) | Ru | $CH_3OC_4H_8$ | $CH_3OC_4H_8$ | n-$C_3H_7$ |
| (92) | Rh | $CH_3OC_4H_8$ | $CH_3OC_4H_8$ | n-$C_5H_{11}$ |
| (93) | VO | $C_2H_5OC_2H_4$ | $C_2H_5OC_2H_4$ | H |
| (94) | Ru | $C_2H_5OC_2H_4$ | $C_2H_5OC_2H_4$ | $CH_3$ |
| (95) | Rh | $C_2H_5OC_2H_4$ | $C_2H_5OC_2H_4$ | $C_2H_5$ |
| (96) | Pd | $C_2H_5OC_2H_4$ | $C_2H_5OC_2H_4$ | n-$C_4H_9$ |
| (97) | Pt | $C_2H_5OC_2H_4$ | $C_2H_5OC_2H_4$ | n-$C_6H_{13}$ |
| (98) | $SiCl_2$ | n-$C_3H_7OC_2H_4$ | n-$C_3H_7OC_2H_4$ | H |
| (99) | Cu | n-$C_3H_7OC_2H_4$ | n-$C_3H_7OC_2H_4$ | $CH_3$ |
| (100) | Zn | n-$C_3H_7OC_2H_4$ | n-$C_3H_7OC_2H_4$ | $C_2H_5$ |
| (101) | FeCl | iso-$C_3H_7OC_2H_4$ | iso-$C_3H_7OC_2H_4$ | n-$C_3H_7$ |
| (102) | Co | iso-$C_3H_7OC_2H_4$ | iso-$C_3H_7OC_2H_4$ | n-$C_5H_{11}$ |
| (103) | MnOH | $C_2H_5OC_3H_6$ | $C_2H_5OC_3H_6$ | H |
| (104) | VO | $C_2H_5OC_3H_6$ | $C_2H_5OC_3H_6$ | $CH_3$ |
| (105) | TiO | $C_2H_5OC_3H_6$ | $C_2H_5OC_3H_6$ | $C_2H_5$ |
| (106) | AlCl | $C_2H_5OC_3H_6$ | $C_2H_5OC_3H_6$ | n-$C_4H_9$ |
| (107) | InCl | $C_2H_5OC_3H_6$ | $C_2H_5OC_3H_6$ | n-$C_6H_{13}$ |
| (108) | Cu | $C_2H_5OC_4H_8$ | $C_2H_5OC_4H_8$ | H |
| (109) | Cu | $C_2H_5OC_4H_8$ | $C_2H_5OC_4H_8$ | $CH_3$ |
| (110) | Ni | $C_2H_5OC_4H_8$ | $C_2H_5OC_4H_8$ | $C_2H_5$ |
| (111) | Zn | $C_2H_5OC_4H_8$ | $C_2H_5OC_4H_8$ | n-$C_3H_7$ |
| (112) | Co | $C_2H_5OC_4H_8$ | $C_2H_5OC_4H_8$ | n-$C_5H_1$ |
| (113) | Cu | $C_2H_5$ | $C_2H_5$ | n-$C_3H_7$ | H |
| (114) | Cu | $C_2H_5$ | n-$C_6H_{13}$ | $CH_3$ |
| (115) | Cu | $C_2H_5$ | n-$C_8H_{17}$ | $C_2H_5$ |
| (116) | Cu | $C_2H_5$ | n-$C_{10}H_{21}$ | n-$C_4H_9$ |
| (117) | Cu | $C_2H_5$ | n-$C_{12}H_{25}$ | n-$C_6H_{13}$ |
| (118) | Ni | iso-$C_5H_{11}$ | $C_2H_5$ | H |
| (119) | Co | iso-$C_5H_{11}$ | n-$C_4H_9$ | $CH_3$ |
| (120) | Zn | iso-$C_5H_{11}$ | n-$C_6H_{13}$ | $C_2H_5$ |
| (121) | VO | iso-$C_5H_{11}$ | n-$C_7H_{15}$ | n-$C_3H_7$ |
| (122) | MnOH | iso-$C_5H_{11}$ | n-$C_{12}H_{25}$ | n-$C_5H_{11}$ |
| (123) | Cu | iso-$C_5H_{11}$ | $CH_3OC_2H_4$ | H |
| (124) | Zn | iso-$C_5H_{11}$ | $CH_3OC_2H_4$ | H |
| (125) | FeCl | iso-$C_5H_{11}$ | $CH_3OC_2H_4$ | H |
| (126) | Co | iso-$C_5H_{11}$ | $CH_3OC_2H_4$ | H |
| (127) | Ni | iso-$C_5H_{11}$ | $CH_3OC_2H_4$ | H |
| (128) | Pd | iso-$C_5H_{11}$ | $CH_3OC_2H_4$ | H |
| (129) | MnOH | iso-$C_5H_{11}$ | $CH_3OC_2H_4$ | H |
| (130) | VO | iso-$C_5H_{11}$ | $CH_3OC_2H_4$ | H |
| (131) | Cu | iso-$C_5H_{11}$ | $CH_3OC_3H_6$ | $CH_3$ |
| (132) | AlCl | iso-$C_5H_{11}$ | $CH_3OC_4H_8$ | $C_2H_5$ |
| (133) | InCl | iso-$C_5H_{11}$ | $C_2H_5OC_2H_4$ | n-$C_{10}H_{21}$ |
| (134) | Ni | iso-$C_5H_{11}$ | $C_2H_5OC_4H_8$ | n-$C_{12}H_{25}$ |
| (135) | $H_2$ | iso-$C_5H_{11}$ | iso-$C_5H_{11}$ | H |
| (136) | VO | iso-$C_5H_{11}$ | iso-$C_5H_{11}$ | n-$C_4H_9$ |
| (137) | VO | iso-$C_5H_{11}$ | iso-$C_5H_{11}$ | n-$C_8H_{17}$ |

The phthalocyanine compound of general formula (I) is a known compound and the compound as such is described in Japanese Kokai Tokkyo Koho H8-60008. The inventors of the present invention explored into the photothermal conversion characteristic of the compound and found that, among various materials absorbing in the near-infrared region of the spectrum, the particular compound has exceedingly high sensitivity to laser light exhibiting a high photothermal conversion efficiency and can be applied with advantage, for example, to laser thermal transfer printing and laser thermal recording materials conducive to high-speed recording and giving high-density, high-image-quality records.

Furthermore, because the phthalocyanine compound of general formula (I) is very readily soluble in various solvents which are generally used in the construction of the photothermal conversion layer of a planographic original plate for CTP use and well compatible with various kinds of binder resins, it can be easily formulated into coating dopes conducive to uniform photothermal conversion layers, thus being found to be particularly suited for the fabrication of planographic original plates for CTP use.

The photothermal conversion material of the invention may contain a binder resin or the like in addition to the phthalocyanine compound of formula (I) which is a light-to-heat converting agent.

Furthermore, the photothermal conversion material of the invention can be implemented by using the phthalocyanine compound of general formula (I) in combination with various known near-infrared-light absorbing substances within the range not contrary to the objects of the invention.

The near-infrared-light absorbing materials mentioned above include not only a variety of pigments such as carbon black, aniline black, etc. but also other colors or dyes such as the polymethine dyes (cyanine dyes), phthalocyanine dyes, dithiol metal complex salt dyes, naphthoquinone dyes, anthraquinone dyes, triphenylmethane (analog) dyes, aminium dyes, diimmonium dyes, azo dyes, indoaniline metal complex dyes, intermolecular CT dyes, etc., all of which are described in "Near-Infrared Absorbing Colors" (P45~51) KAGAKU KOGYO (Chemical Industry) (May 1986 issue) and in Chapter 2-2.3 of "The Development and Market Trend of Functional Dyes in the Ninties", CMC (1990).

The binder resin is not particularly restricted in kind but includes the homopolymers and copolymers of acrylic monomers such as acrylic acid, methacrylic acid, acrylic esters, methacrylic esters, etc., cellulosic polymers such as methylcellulose, ethylcellulose, cellulose acetate, etc., vinyl polymers and vinyl copolymers such as polystyrene, vinyl chloride-vinyl acetate copolymer, polyvinylpyrrolidone, polyvinyl butyral, polyvinyl alcohol, etc., condensation polymers such as polyesters and polyamides, rubber-like thermoplastic polymers such as butadiene-styrene copolymer etc., and polymers available upon polymerization and crosslinking of photopolymerizable compounds such as epoxy compounds.

When the photothermal conversion material of the invention is applied to a recording medium such as a laser thermal transfer printing material or a laser thermal recording material, it can be used as formulated with a chromogenic or coloring agent or, as an alternative, a discrete layer containing such a chromogenic or coloring agent may be provided. As the chromogenic or coloring agent, there can be employed sublimable dyes or pigments, electron-donating dye precursors and electron-accepting compounds, polymerizable polymers and various other substances capable of forming images by undergoing physical or chemical change in response to heat which are in use or under development. For example, the coloring agent which can be used in the laser thermal transfer printing material includes but is not limited to inorganic pigments such as titanium dioxide, carbon black, zinc oxide, Prussian blue, cadmium sulfide, iron oxide, and chromates of lead, zinc, barium, and calcium, and organic colors such as azo, thioindigo, anthraquinone, anthoanthrone, triphendioxane, phthalocyanine, quinacridone, and other dyes. As examples of the dye, acid dyes, direct dyes, dispersed dyes, oil-soluble dyes, and metal-containing oil-soluble dyes can be mentioned.

The chromogenic agent for use in the laser thermal recording material is not particularly restricted but any of the substances in use in the conventional thermal recording materials can be employed. The electron-donating dye precursor is a compound which donates an electron or accepts the proton of an acid or the like to develop a color and, as such, includes those compounds which have a partial structure such as a lactone, lactam, sultone, spiropyran, ester, or amide structure which undergoes ring-opening or cleavage upon contact with an electron-accepting compound. Thus, for example, triphenylmethane compounds, fluoran compounds, phenothiazine compounds, indolylphthalide compounds, leucoauramine compounds, rhodamine lactam compounds, triazene compounds, spiropyran compounds, and fluorene compounds can be mentioned. The electron-accepting compound includes phenolic compounds, organic acids and salts thereof, hydroxybenzoic acid esters, and so forth.

The photothermal conversion material of the invention can be applied with advantage to a planographic original plate for CTP use. The planographic original plate for CTP use comprises a support and, as disposed thereon, a photothermal conversion layer. Optionally a silicone rubber layer may be constructed on the photothermal conversion layer and a protective or other layer may be further provided in superimposition.

As components of the photothermal conversion layer, there may be an image-forming component in addition to the photothermal conversion material. Alternatively, a layer containing the image-forming component may be built up on the photothermal conversion layer.

The image-forming component is a material which, when heated, undergoes physical or chemical change to form an image and the variety of materials heretofore proposed or in use can be utilized. For example, the material containing a microencapsulated heat-fusible substance and a binder resin as disclosed in Japanese Kokai Tokkyo Koho H3-108588, the material comprising an active hydrogen-containing binder and a blocked isocyanate on the hydrophilic surface of a support as disclosed in Japanese Kokai Tokkyo Koho S62-164049, the material comprising a microencapsulated lipophilic component and a hydrophilic polymer binder as disclosed in Japanese Kokai Tokkyo Koho H7-1849, the material comprising an acid precursor, a vinyl ether-containing compound and an alkali-soluble resin as disclosed in Japanese Kokai Tokkyo Koho H8-220752, the material comprising a hydroxy-containing macromolecular compound and an o-naphthoquinone diazide compound as disclosed in Japanese Kokai Tokkyo Koho H9-5993, the material containing nitrocellulose etc. as disclosed in Japanese Kokai Tokkyo Koho H9-131977, the material comprising a polymerization initiator and an ethylenically unsaturated monomer, oligomer or macromonomer as disclosed in Japanese Kokai Tokkyo Koho H9-146264, among others. In certain applications, the objective image can be formed by constructing a silicone rubber layer on a photothermal conversion layer (light-sensitive layer or a heat-sensitive recording layer) and, after exposure, bringing the silicone layer into intimate contact or apart as described in Japanese Kokai Tokkyo Koho H9-80745, Kokai Tokkyo Koho H9-131977, and Kokai Tokkyo Koho H9-146264, for instance.

The planographic original plate for CTP use according to the present invention should have a sufficient degree of flexibility to permit setting on a conventional printing press and, at the same time, have a sufficient strength to withstand the load which may act on it during the printing process. The support, therefore, can be made from many kinds of materials such as paper, plastic (e.g. polyethylene, polypropylene, polystyrene, etc.) -laminated paper, metal sheets made from aluminum (inclusive of its alloys), zinc, copper, etc., and plastic films such as cellulose diacetate, cellulose triacetate, cellulose butyrate, polyethylene terephthalate, polyethylene, polystyrene, polypropylene, polycarbonate, polyvinyl acetate, etc. As representative supports, coated paper, aluminum or other metal sheets, polyethylene terephthalate or other plastic film, rubber, and their composites can be mentioned. The preferred support material includes aluminum, aluminum alloy, and plastic film. The thickness of the support is 25 $\mu$m~3 mm, preferably 100 $\mu$m~500 $\mu$m.

The usual process for fabricating a planographic original plate comprises dispersing or dissolving the photothermal conversion material and image-forming component in a solvent and coating a support with the dispersion or solution.

The solvent which can be used in this process includes water, alcohols such as methyl alcohol, isopropyl alcohol, isobutyl alcohol, cyclopentanol, cyclohexanol, diacetone alcohol, etc., cellosolves such as methylcellosolve, ethylcellosolve, etc., aromatic hydrocarbons such as toluene, xylene, chlorobenzene, etc., esters such as ethyl acetate, butyl acetate, isoamyl acetate, methyl propionate, etc., =ketones such as acetone, methyl ethyl ketone, methyl isobutyl ketone, cyclohexanone, etc., chlorinated hydrocarbons such as methylene chloride, chloroform, trichloroethylene, etc., ethers such as tetrahydrofuran, dioxane, etc., and aprotic polar solvents such as N,N-dimethylformamide, N-methylpyrrolidone, and so forth.

For improved adhesion and printing quality, a subbing (undercoat) layer may be interposed between the support and the photothermal conversion layer or the support itself may be surface-treated. The subbing layer may for example be a light-sensitive polymer layer photocured prior to construction of the photothermal conversion layer as disclosed in Japanese Kokai Tokkyo Koho S60-22903, the heat-cured expoxy resin layer disclosed in Japanese Kokai Tokkyo Koho S62-50760, the cured gelation film disclosed in Japanese Kokai Tokkyo Koho S63-133151, the layer formed by using a urethane resin and a silane coupling agent as disclosed in Japanese Kokai Tokkyo Koho H3-200965, and the urethane resin layer disclosed in Japanese Kokai Tokkyo Koho H3-273248.

To provide a protective film for the purpose of protecting the surface of said photothermal conversion layer or silicone rubber layer, a transparent film such as polyethylene, polypropylene, polyvinyl chloride, polyvinylidene chloride, polyvinyl alcohol, polyethylene terephthalate, or cellophane film may be laminated or such a film may be drawn and used.

To fabricate a planographic printing plate, the above planographic original plate for CTP use is irradiated with the light of a semiconductor laser having an emission band of 750~900 nm in the per se known manner.

EXAMPLES

The following examples are intended to illustrate the present invention in further detail and should by no means be construed as defining the scope of the invention.

Example 1

A polyethylene terephthalate (PET) film with an average thickness of 5 $\mu$m is coated with a solution containing 10 g of the binder Delpet 80N (acrylic resin, Asahi Chemical Industry) and 0.2 g of Compound No. 34 (Table 1) in 90 g of toluene-methyl ethyl ketone (1:1) using a wire bar in a dry film thickness of about 5 $\mu$m to provide a sample.

A single-mode semiconductor laser (wavelength 830 nm) and optics were disposed so as to provide a condensed laser beam with a diameter of 10 $\mu$m on the surface of said sample. The semiconductor laser was set so as to permit variation of the power of laser light reaching the surface over the range of 50~200 mW and the sample was irradiated with the single pulse at the pulse width of 20 $\mu$s. After completion of the irradiation, the sample was examined under the light microscope. As a result, a through-hole with a diameter of about 10 $\mu$m was formed when the power of laser light reaching the surface was 70 mW.

Example 2

Except that 0.2 g of Compound No. 93 (Table 1) was used in lieu of Compound No. 34 (Table 1), the procedure of Example 1 was otherwise repeated. Examination of the irradiated sample under the light microscope revealed that a through-hole with a diameter of about 10 $\mu$m was formed when the power of laser light reaching the surface was 80 mW.

Example 3

A polyethylene terephthalate (PET) film having an average thickness of 5 $\mu$m was coated with a solution containing 10 g of the binder Delpet 80N (acrylic resin, Asahi Chemical Industry) and 0.2 g of Compound No. 27 (Table 1) in 90 g of toluene-methyl ethyl ketone (1:1) using a wire bar in a dry film thickness of about 5 $\mu$m to provide a sample.

A single-mode semiconductor laser (wavelength 790 nm) and optics were disposed so as to provide a condensed laser beam with a diameter of 10 $\mu$m on the surface of said sample. The semiconductor laser was set so as to permit variation of the power of laser light reaching the surface over the range of 50~200 mW and the sample was irradiated with the single pulse at the pulse width of 20 $\mu$s. After completion of the irradiation, the sample was examined under the light microscope. As a result, a through-hole with a diameter of about 10 $\mu$m was formed when the power of laser light reaching the surface was 70 mW.

Example 4

Except that 0.2 g of Compound No. 36 (Table 1) was used in lieu of 0.2 g of Compound No. 27 (Table 1), the procedure of Example 3 was otherwise repeated. As a result, a through-hole with a diameter of about 10 $\mu$m was formed when the power of laser light reaching the surface was 80 mW.

Example 5

Formation of a subbing layer

As the undercoat on a polyethylene terephthalate film having a thickness of 175 $\mu$m, a gelatin subbing layer was constructed in a dry film thickness of 0.2 $\mu$m.

Formation of a photothermal conversion layer

A coating dope according to the following recipe was applied over the above gelatin-coated polyethylene terephthalate film in a dry film thickness of 2 $\mu$m to provide a photothermal conversion layer.

| | Parts by weight |
|---|---|
| Compound No. 34 (Table 1) | 0.1 |
| Crisvon 3006 LV (polyurethane; Dainippon Ink and Chemicals) | 5.0 |
| Solsperse S27000 (ICI) | 0.4 |
| Nitrocellulose (n-propanol 30% contained) | 4.2 |
| Xylylenediamine (1 mol)-glycidyl methacrylate (4 mol) adduct | 2.0 |
| Ethyl Michler's ketone | 0.2 |
| Tetrahydrofuran | 90 |

Formation of a silicone rubber layer

A coating dope conforming to the following recipe was applied over the above photothermal conversion layer in a dry film thickness of 2 $\mu$m to provide a silicone rubber layer.

| | Parts by weight |
|---|---|
| $\alpha, \omega$ - Divinylpolydimethylsiloxane (deg. of polymerization: ca 700) | 9.0 |
| $(CH_3)_3Si-O-(SiH(CH_3)-O)_8-Si(CH_3)_3$ | 0.6 |
| Polydimethylsiloxane (deq. of polymerization: ca 8000) | 0.5 |
| Olefin-chloroplatinate | 0.08 |
| Inhibitor $HC\equiv C-C(CH_3)_2-O-Si(CH_3)_3$ | 0.07 |
| Isopar G (Esso Chemical) | 55 |

Using the planographic original plate obtained above, writing was performed using a semiconductor laser with a beam diameter of 10 $\mu$m and an emission wavelength of 830 nm under the conditions that the power on the plate surface was 110 mW. The laser recording sensitivity was 200 mJ/cm$^2$ and the resolution was 8 $\mu$m. Thus, a planographic printing plate with sharp edges could be obtained.

Example 6

Except that 0.1 part by weight of Compound No. 93 (Table 1) was used in lieu of 0.1 part by weight of Compound No. 34 (Table 1), the procedure of Example 5 was otherwise repeated to provide a planographic original plate.

Using the planographic original plate obtained above, writing was performed using a semiconductor laser with a beam diameter of 10 μm and an emission wavelength of 830 nm under the conditions that the power on the plate surface was 110 mW. The laser recording sensitivity was 200 mJ/cm² and the resolution was 8 μm. Thus, a planographic printing plate with sharp edges could be obtained.

Example 7

Except that 0.1 part by weight of Compound No. 27 (Table 1) was used in lieu of 0.1 part by weight of Compound No. 34 (Table 1), the procedure of Example 5 was otherwise repeated to provide a planographic original plate.

Using the planographic original plate obtained above, writing was performed using a semiconductor laser with a beam diameter of 10 μm and an emission wavelength of 790 nm under the conditions that the power on the plate surface was 110 mW. The laser recording sensitivity was 200 mJ/cm² and the resolution was 8 μm. Thus, a planographic printing plate with sharp edges could be obtained.

Example 8

Except that 0. 1 part by weight of Compound No. 43 (Table 1) was used in lieu of 0.1 part by weight of Compound No. 34 (Table 1), the procedure of Example 5 was otherwise repeated to provide a planographic original plate.

Using the planographic original plate obtained above, writing was performed using a semiconductor laser with a beam diameter of 10 μm and an emission wavelength of 830 nm under the conditions that the power on the plate surface was 110 mW. The laser recording sensitivity was 200 mJ/cm² and the resolution was 8 μm. Thus, a planographic printing plate with sharp edges could be obtained.

Example 9

Except that 0. 1 part by weight of Compound No. 136 (Table 1) was used in lieu of 0.1 part by weight of Compound No. 34 (Table 1), the procedure of Example 5 was otherwise repeated to provide a planographic original plate.

Using the planographic original plate obtained above, writing was performed using a semiconductor laser with a beam diameter of 10 μm and an emission wavelength of 830 nm under the conditions that the power on the plate surface was 110 mW. The laser recording sensitivity was 200 mJ/cm² and the resolution was 8 μm. Thus, a planographic printing plate with sharp edges could be obtained.

Example 10

Except that 0.1 part by weight of Compound No. 137 (Table 1) was used in lieu of 0.1 part by weight of Compound No. 34 (Table 1) the procedure of Example 5 was otherwise repeated to provide a planographic original plate.

Using the planographic original plate obtained above, writing was performed using a semiconductor laser with a beam diameter of 10 μm and an emission wavelength of 830 nm under the conditions that the power on the plate surface was 110 mW. The laser recording sensitivity was 200 mJ/cm² and the resolution was 8 μm. Thus, a planographic printing plate with sharp edges could be obtained.

EFFECT OF THE INVENTION

The photothermal conversion material of the present invention shows high sensitivity to the light of a semiconductor laser having an emission frequency band in the near-infrared region (750 nm~900 nm) of the spectrum and high photothermal conversion efficiency so that it can be used in a variety of applications. Moreover, the original plate for CTP use which incorporates this photothermal conversion material is easy to fabricate and provides prints with high image quality.

What is claimed is:

1. A light-to-heat converting phthalocyanine compound of the following general formula (I)

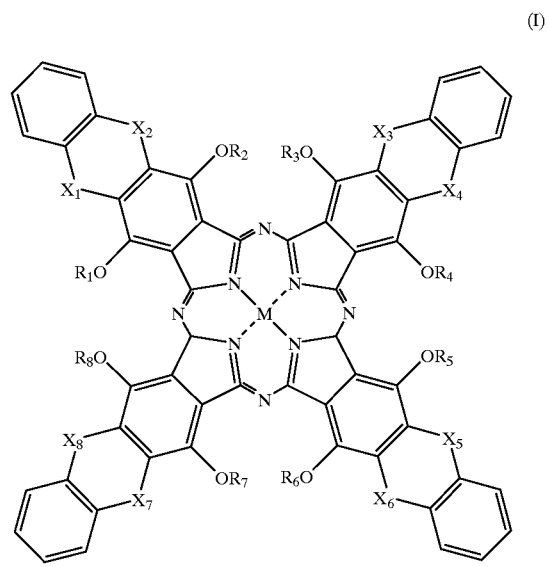

(I)

wherein $R_1$–$R_8$ each represents alkyl or alkoxyalkyl; $X_1$–$X_8$ each represents sulfur or $NR_9$; $X_1$=(either $X_3$ or $X_4$)=either ($X_5$ or $X_6$)=(either $X_7$ or $X_8$)=sulfur and $X_2$=(the other one of $X_3$ and $X_4$)=(the other one of $X_5$ and $X_6$)=(the other one of $X_7$ and $X_8$)=$NR_9$; $R_9$ represents hydrogen or alkyl; and M represents a couple of hydrogen atoms, a divalent metal, a trivalent metal derivative, or a tetravalent metal derivative.

2. The compound according to claim 1 wherein M in general formula (I) is Co, Ni, Cu, Zn, VO or TiO.

3. The compound according to claim 1 or 2 wherein each of $R_1$–$R_8$ in general formula (I) is a straight-chain or branched alkyl group containing 1–12 carbon atoms or an alkoxyalkyl group containing a total of 2–6 carbon atoms.

4. The compound according to claim 1 wherein $R_9$ in general formula (I) is hydrogen or a straight-chain or branched alkyl group containing 1–12 carbon atoms.

5. A planographic original plate for CTP use which comprises a support and, as disposed thereon, a photothermal conversion layer containing the photothermal conversion material claimed in claim 1.

6. A method of fabricating a planographic printing plate which comprises preparing the planographic original plate of claim 5 and irradiating the plate using a semiconductor laser having an emission band of 750 nm~900 nm as a light source.

7. A photothermal conversion material which comprises the compound according to claim 1 and a binder resin.

8. The photothermal conversion material according to claim 7, which further comprises a near-infrared-light absorbing substance.

9. The photothermal conversion material according to claim 7, wherein the binder resin is selected from the group consisting of polymers of acrylic acid, polymers of methacrylic acid, polymers of acrylic esters, polymers of methacrylic esters, polymers of methylcellulose, polymers of ethylcellulose, polymers of cellulose acetate, polystyrene, vinyl chloride-vinyl acetate copolymer, polyvinylpyrrolidone, polyvinyl butyral, polyvinyl alcohol, polyester, polyamide, butadiene-styrene copolymer and epoxy.

10. The photothermal conversion material according to claim 8, wherein the near-infrared-light absorbing substance is selected from the group consisting of carbon black, aniline black, polymethine dye, phthalocyanine dye, dithiol metal complex salt dye, naphthoquinone dye, anthraquinone dye, triphenylmethane dye, aminium dye, diimmonium dye, azo dye, indoaniline metal complex dye and intermolecular CT dye.

* * * * *